E. C. SENKPIEL.
VALVE TAPPET.
APPLICATION FILED MAR. 5, 1919.
1,318,609.
Patented Oct. 14, 1919.
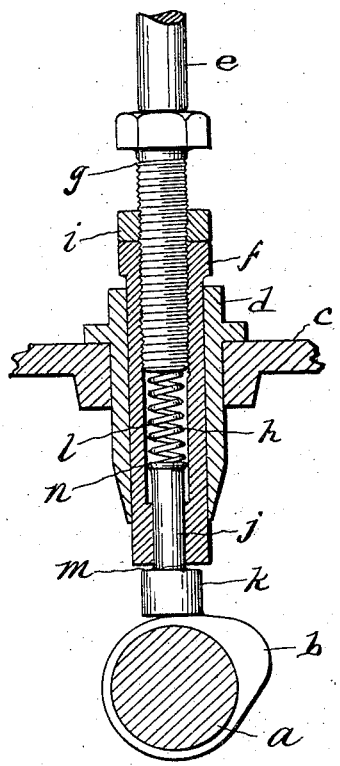
INVENTOR
Edward C. Senkpiel
BY
Stuart C Barnes
ATTORNEY.

UNITED STATES PATENT OFFICE.

EDWARD C. SENKPIEL, OF DETROIT, MICHIGAN.

VALVE-TAPPET.

1,318,609.  Specification of Letters Patent.  Patented Oct. 14, 1919.

Application filed March 5, 1919. Serial No. 280,697.

*To all whom it may concern:*

Be it known that I, EDWARD C. SENKPIEL, a citizen of the United States, residing at Detroit, county of Wayne, State of Michigan, have invented a new and useful Improvement in Valve-Tappets, of which the following is a specification.

This invention relates to valve tappets and has for its object a valve tappet that is practically noiseless and which can be completely assembled and be handled as a unit in stock. As is well understood, clearance must always be provided between the valve tappet and the valve stem or the push rod; otherwise when they expand under the heat of the engine the valve will ride. This clearance, of course, results in the clicking of the valve tappets, which is so noticeable in many motors.

It is the object of this invention to deaden that clicking and invert the position of the clearance space from the position above the crank case to a position in the crank case.

It is not broadly new to have a two-part telescoping valve tappet in which the telescoping parts are spaced by a spring and both ends of the tappet are caused to follow the respective parts that they contact. However, a very serious objection to these tappets so constructed has been that they have had to be assembled on the job, that is, the several parts of the tappet have to either be put together and finally assembled in the engine or else they have to be assembled in the bushing and then the bushing assembled into the engine. Both of these objections are obviated in the construction that I am about to describe.

In the drawings,—

The figure is a longitudinal section of the tappet.

$a$ designates the cam shaft; $b$ the cam; $c$ the top of the crank case; $d$ the usual tappet bushing; $e$ the bottom of the valve stem or the push rod. The tappet is made in the form of a pair of telescoping members. One is a sleeve $f$ which is carefully fitted into the bushing $d$ and guided therein. This sleeve $f$ is provided with two bores from opposite ends forming a shoulder where they meet. One bore is partially screw-threaded to receive the cap screw $g$ with a hexagonal head and partly plain to form a valve chamber $h$. The jam nut $i$ can be used to set the cap screw to any position of adjustment. Through the lower plain bore of reduced diameter runs the stem $j$ of the other telescoping member, which is provided with a head $k$ that rides the cam $b$ and also is adapted to engage the end of the sleeve $f$ to raise the valve stem or push rod $e$. The spring $l$ is entirely housed within the chamber $h$ and serves to push the two members apart and always keep the hexagonal head of the screw $g$ against the valve stem or push rod $e$ and the head $k$ of the smaller telescoping member on the surface of the cam. Hence when the valve is closed, the clearance space will be at $m$ between the lower end of the sleeve and the head $k$ of the smaller telescoping member. Here the head is completely bathed in oil due to the oil mist that always exists in the crank case where the splash system of lubrication is used. This oil serves to deaden the clicking sound when the undercut portions of the head strike the end of the sleeve. Furthermore, the point of contact is carried clear down into the crank case, whose thick walls materially deaden the sound. If any oil pumps up into the spring chamber $h$ it will be of no consequence as it can get no farther.

A very fundamental advantage of this type of noiseless valve tappet is not only its simplicity but the fact that the head of the stem $j$ may be upset as at $n$ to tie the parts completely together so that they exist as a unit, can be carried in stock as a unit, and lifted out of a job as a unit without in any way interfering with the bushing or the crank case. The upsetting may obviously be done by placing the stem of the smaller telescoping member in the sleeve and striking it with an instrument, such as a punch, before the screw $g$ is put in place, the punch entering through the screw hole. The spring may then be put in place and the screw $g$ put in place, which completely assembles the entire two-part tappet.

What I claim is:

1. A valve tappet, having in combination, a sleeve provided with a shoulder on its interior, a closure for the outer end of the sleeve, a telescoping member provided with a stem slidable in the inner end of the sleeve and by the said shoulder, the extreme inner end of the stem being upset after it has been passed therein, a head on the other end of the stem adapted when the telescoping member is lifted to contact the end of the said sleeve, and a spring between the closure and the end of the stem.

2. A valve tappet, having in combination, a sleeve screw-threaded at one end and provided with a shoulder near the other end, an adjusting screw running in the threads of the screw-threaded end, a telescoping member provided with a stem sliding in the opening in the other end of the sleeve and having a head adapted to contact the end of the sleeve when the telescoping member is lifted, the inner end of the stem being upset to retain the member in the sleeve after it has been inserted, and a spring between the end of the screw and the end of the stem.

3. A valve tappet, comprising a sleeve interiorly screw-threaded at one end and having a smooth bore at the opposite end, a telescoping member slidable in the smooth bore, a shoulder on the interior of the sleeve, the end of the telescoping member being upset after it has passed the shoulder, a screw run into the threaded end of the sleeve, and a spring between the end of the screw and the end of the telescoping member.

4. A valve tappet, having a sleeve having a bore of large diameter upon the outer end and a bore of smaller diameter in the inner end forming an intervening shoulder, a portion of the bore of larger diameter being screw-threaded, a telescoping member fitted into the bore of smaller diameter and having its head upset to assemble it therein, a screw run into the threads of the larger diameter, and an intervening spring between the end of the screw and the end of the telescoping member.

In witness whereof I have hereunto set my hand on the 27th day of February, 1919.

EDWARD C. SENKPIEL